United States Patent
Hesselbarth

(10) Patent No.: US 11,520,356 B2
(45) Date of Patent: Dec. 6, 2022

(54) CONTROL METHOD FOR CONTROLLING A YAW ANGLE AND A ROLL ANGLE OF A VERTICAL TAKE-OFF AIRCRAFT

(71) Applicant: Wingcopter GmbH, Darmstadt (DE)

(72) Inventor: Jonathan Hesselbarth, Darmstadt (DE)

(73) Assignee: Wingcopter GmbH, Weiterstadt (DE)

(*) Notice: Subject to any disclaimer, the term of this patent is extended or adjusted under 35 U.S.C. 154(b) by 412 days.

(21) Appl. No.: 16/619,505

(22) PCT Filed: Jun. 6, 2018

(86) PCT No.: PCT/EP2018/064934
§ 371 (c)(1),
(2) Date: Dec. 5, 2019

(87) PCT Pub. No.: WO2018/224567
PCT Pub. Date: Dec. 13, 2018

(65) Prior Publication Data
US 2020/0257315 A1    Aug. 13, 2020
US 2021/0247780 A9    Aug. 12, 2021

(30) Foreign Application Priority Data

Jun. 6, 2017 (DE) .................... 10 2017 112 452.7

(51) Int. Cl.
*G05D 1/08*    (2006.01)
*B64C 29/00*   (2006.01)
*B64C 39/02*   (2006.01)

(52) U.S. Cl.
CPC ....... *G05D 1/0858* (2013.01); *B64C 29/0033* (2013.01); *B64C 39/024* (2013.01)

(58) Field of Classification Search
None
See application file for complete search history.

(56) References Cited

U.S. PATENT DOCUMENTS

| 8,128,033 | B2 | 3/2012 | Raposo |
| 9,187,174 | B2 | 11/2015 | Shaw |
| 2012/0261523 | A1 | 10/2012 | Shaw |
| 2015/0175260 | A1 | 6/2015 | Hesselbarth |
| 2015/0360776 | A1* | 12/2015 | Briod ............... B64C 17/00 244/23 A |

(Continued)

FOREIGN PATENT DOCUMENTS

| DE | 102014000509 A1 | 7/2015 |
| JP | 2014231253 A | 12/2014 |

(Continued)

*Primary Examiner* — Hunter B Lonsberry
*Assistant Examiner* — Paysun Wu
(74) *Attorney, Agent, or Firm* — Smartpat PLC

(57) ABSTRACT

A control method for controlling a yaw angle $\gamma_z$ and a roll angle $\gamma_x$ of a vertical take-off aircraft comprising at least two drive groups arranged in opposite side regions of the aircraft so as to be spaced apart from a fuselage of the aircraft is presented. Each drive group comprises at least one first drive unit. The first drive unit is arranged so as to be spaced apart from the fuselage to pivot about a pivot angle α into a horizontal flight position and a vertical flight position.

9 Claims, 1 Drawing Sheet

(56) References Cited

U.S. PATENT DOCUMENTS

| | | | |
|---|---|---|---|
| 2016/0023755 A1* | 1/2016 | Elshafei | B64C 39/024 244/17.23 |
| 2017/0158321 A1 | 6/2017 | Mia | |
| 2018/0164835 A1* | 6/2018 | Artemiadis | G05D 1/0858 |
| 2019/0152593 A1 | 5/2019 | Aldave et al. | |
| 2020/0103922 A1* | 4/2020 | Nonami | G05D 1/0072 |

FOREIGN PATENT DOCUMENTS

| | | |
|---|---|---|
| JP | 2017007429 A | 1/2017 |
| RU | 2456208 C1 | 7/2012 |
| WO | 2014016226 A1 | 1/2014 |
| WO | 2016009376 A1 | 1/2016 |
| WO | 2017077144 A1 | 5/2017 |

\* cited by examiner

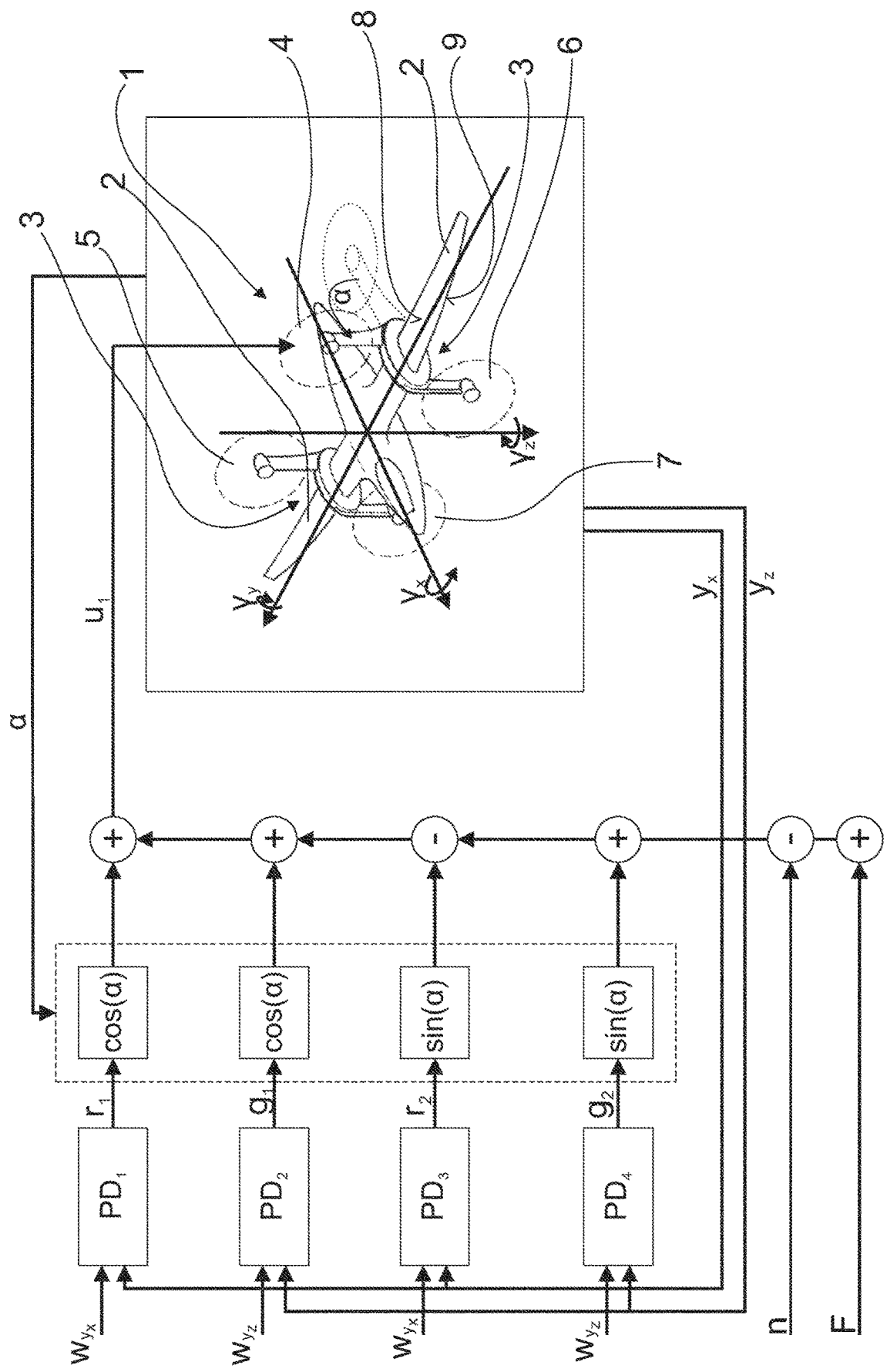

CONTROL METHOD FOR CONTROLLING A YAW ANGLE AND A ROLL ANGLE OF A VERTICAL TAKE-OFF AIRCRAFT

TECHNICAL FIELD

The disclosure relates to a control method for controlling a yaw angle and a roll angle of a vertical take-off aircraft comprising at least two drive groups arranged in opposite side regions of the aircraft so as to be spaced apart from a fuselage of the aircraft, each drive group comprising at least one first drive unit, the first drive unit being arranged so as to be spaced apart from the fuselage to pivot about a pivot angle $\alpha$ into a horizontal flight position and a vertical flight position.

BACKGROUND

Vertical take-off aircraft are used, inter alia, as drones and in the military field. These aircraft usually comprise two wings arranged on opposite sides of a fuselage, with two drive units being arranged so as to be pivotally mounted on each of the wings in supporting elements, such as gondolas, which are rigidly connected to the wings and are adapted to the intended purpose. Aircraft are also known in which there is no separate fuselage and the wings are formed by two half-wings that are symmetrical along the longitudinal axis, with two drive units being arranged so as to be pivotally mounted on each of the half-wings in supporting elements which are rigidly connected to the half-wings and are adapted to the intended purpose.

In addition, vertical take-off aircraft are known from the prior art in which the drive units are pivotally mounted directly on the wings, for example on a supporting structure extending within the wing. A vertical take-off aircraft of this type is described in WO 2014/016226 A1. In this vertical take-off aircraft, it is provided that, in the horizontal flight position, the first drive unit is arranged on the wing above the wing surface and the second drive unit is arranged on the wing below the wing surface, and that, in the vertical flight position, the first drive unit and the second drive unit are arranged in an approximately horizontal plane. In this way, in the vertical flight phase close to the ground, a uniform ground effect of the first and second drive unit is achieved, such that smoother flight behavior is achieved, in particular in the take-off and landing phase. In the horizontal flight position, the first drive unit and the second drive unit do not flow against one another, and therefore this does not bring about any loss of efficiency.

In order to control the yaw angle and roll angle, in particular of multicopters, control methods are known in which the desired yaw and roll is achieved by suitably actuating the drive units, which are not pivotable on multicopters. In this case, the power provided by the respective drive units is predetermined individually to each drive, in order to generate the yaw and roll by means of the differences in lift and torque that are generated in this way.

An orientation of the aircraft in three-dimensional space is usually described by the roll, pitch and yaw angles. In this case, the different angles describe rotational angles of the aircraft starting from a zero position which may, for example, correspond to the orientation of the aircraft when standing on the ground about a longitudinal, transverse and vertical axis of the aircraft.

SUMMARY

The problem addressed by the invention is considered that of providing a corresponding control method for controlling the yaw angle and roll angle by suitably actuating the drive units for vertical take-off aircraft, by means of which control is possible both in vertical flight as well as during the transition into horizontal flight, and in horizontal flight.

This problem is solved by a control method for controlling a yaw angle and a roll angle of a vertical take-off aircraft of the type described at the outset, wherein power generated by each of the drive units is adapted in order to reach a predetermined target yaw angle and a predetermined target roll angle, wherein, in a determination step, a first yaw control parameter $g_1$ and a second yaw control parameter $g_2$ as well as a first roll control parameter $r_1$ and a second roll control parameter $r_2$ are determined, wherein the first yaw control parameter and the first roll control parameter are vertical control parameters for reaching the target yaw angle and the target roll angle in the vertical flight position, wherein the second yaw control parameter and the second roll control parameter are horizontal control parameters for reaching the target yaw angle and the target roll angle in the horizontal flight position, wherein, in a subsequent superimposing step, an actuation parameter is determined, by means of a superimposing rule for each drive unit, from the vertical control parameters and the horizontal control parameters on the basis of the pivot angle, and wherein a power of the drive units is then predetermined taking into account the actuation parameters.

Different actuation parameters are required in all the pivot positions of the drive units in order to achieve the desired yaw and roll behavior. By means of the continuous calculation of the horizontal control parameters and the vertical control parameters as well as superimposition of the parameters determined for the horizontal flight and vertical flight, the control method can be implemented particularly simply, since the control method only has to be designed for the two extreme horizontal and vertical flight positions. In order to determine the horizontal control parameters and the vertical control parameters, control and regulation parameters that are known from the prior art can be used. The actuation parameters may for example be power difference values that describe the deviation from the total power required by the drive units to reach the target yaw and roll angles, the total power corresponding to the power requirement requested by a pilot. The actuation parameters are advantageously determined from roll control parameters and yaw control parameters which represent absolute values for the required power difference values in horizontal flight and vertical flight.

It is advantageously provided that each drive group comprises a first drive unit and a second drive unit, the first drive unit and the second drive unit each being arranged so as to be spaced apart from the fuselage to pivot about a pivot angle $\alpha$ into a horizontal flight position and a vertical flight position. It is advantageously provided that the first drive units and/or the second drive units are arranged on opposite wings of the aircraft. It is, however, also possible that the drive units are arranged on the fuselage, advantageously by means of supporting frames, so as to be spaced apart from the fuselage. The drive units may advantageously comprise rotors.

In a simplification of the described method, it is advantageously provided that the second yaw control parameter is determined on the basis of the first yaw control parameter by multiplication by a yaw factor and/or in that the second roll control parameter is determined on the basis of the first roll control parameter by multiplication by a roll factor. It is also possible that the respective first control parameters are determined by multiplying the respective second control parameters by the associated factor.

It is advantageously provided that, in the determining step, an actual yaw angle and an actual roll angle are determined, and that the control parameters are each determined by means of a control algorithm starting from the target yaw angle and the target roll angle as well as the actual yaw angle and the actual roll angle. The actual yaw angle and the actual roll angle may advantageously be detected by means of suitable sensors and may be transferred to a microcontroller or flight controller executing the control algorithm and/or the control method.

It is advantageously provided that the first yaw control parameter is determined on the basis of the target yaw angle and the actual yaw angle using a first yaw control algorithm and/or that the second yaw control parameter is determined on the basis of the target yaw angle and the actual yaw angle using a second yaw control algorithm and/or that the first roll control parameter is determined on the basis of the target roll angle and the actual roll angle using a first roll control algorithm and/or that the second roll control parameter is determined on the basis of the target roll angle and the actual roll angle using a second roll control algorithm. By using a plurality of separate control algorithms to determine the control parameters, the design of the individual control algorithms can be significantly simplified, since only SISO systems have to be taken into account. Coupling between the output variables can then optionally be taken into account by the advantageously non-linear superimposition of the different control parameters.

In a particularly advantageous embodiment of the method, it is provided that the first yaw control algorithm and/or the second yaw control algorithm and/or the first roll control algorithm and/or the second roll control algorithm is a linear controller having a P or PD proportion. The use of linear controllers having a P or PD proportion is particularly simple. Advantageously, the control algorithms may additionally also have an I proportion.

Advantageously, the first yaw control parameter $g_1$ is determined using a PD controller starting from the actual yaw angle $y_{\gamma_z}$ advantageously determined using suitable sensors and from the actual yaw rate $\dot{y}_{\gamma_z}$ advantageously also detected using sensors and starting from the predetermined target yaw angle $w_{\gamma_z}$, in accordance with the following provision:

$$g_1 = (P_{g_1} \cdot (w_{\gamma_z} - y_{\gamma_z}) - \dot{y}_{\gamma_z}) \cdot D_{g_1}$$

The factor $P_{g_1}$ represents the P proportion of the PD controller and the factor $D_{g_1}$ represents the D proportion of the PD controller for determining the first yaw control parameter $g_1$. In a comparable manner, the first roll control parameter $r_1$, the second yaw control parameter $g_2$ and the second roll control parameter $r_2$ are determined in accordance with the following provisions, with the actual roll angle $y_{\gamma_x}$ advantageously detected using suitable sensors, the actual roll rate $\dot{y}_{\gamma_x}$ likewise advantageously detected by sensors and the predetermined target roll angle $w_{\gamma_x}$ additionally being used:

$$r_1 = (P_{r_1} \cdot (w_{\gamma_x} - y_{\gamma_x}) - \dot{y}_{\gamma_x}) \cdot D_{r_1}$$

$$g_2 = (P_{g_2} \cdot (w_{\gamma_z} - y_{\gamma_z}) - \dot{y}_{\gamma_z}) \cdot D_{g_2}$$

$$r_2 = (P_{r_2} \cdot (w_{\gamma_x} - y_{\gamma_x}) - \dot{y}_{\gamma_x}) \cdot D_{r_2}$$

It is advantageously provided that the P proportion $P_{g_1}$ and the D proportion $D_{g_1}$ for determining the first yaw control parameter $g_1$ correspond to the P proportion $P_{r_2}$ and the D proportion $D_{r_2}$ of the PD controller for determining the second roll control parameter $r_2$, and that the P proportion $P_{r_1}$ and the D proportion $D_{r_1}$ for determining the first roll control parameter $r_1$ correspond to the P proportion $P_{g_2}$ and the D proportion $D_{g_2}$ of the PD controller for determining the second yaw control parameter $g_2$.

In order to determine the actual roll angle $y_{\gamma_x}$, the actual roll rate $\dot{y}_{\gamma_x}$, the actual yaw angle $y_{\gamma_z}$ and the actual yaw rate $\dot{y}_{\gamma_z}$, the aircraft advantageously comprises a gyroscope, an acceleration sensor and a compass, with the required angles and rates being determined on the basis of methods known from the prior art, such as a Kalman filter composed of measured variables detected by these sensors.

It is also provided that the horizontal control parameters and the vertical control parameters are continuously each determined using a control algorithm or a common control algorithm. Each control algorithm used may be a linear or non-linear controller.

It is advantageously provided that, in the superimposing step, the vertical control parameters and the horizontal control parameters are each multiplied by a drive-unit-specific and pivot-angle-specific evaluation function and the actuation parameters for each drive unit are determined by a linear combination of the vertical control parameters multiplied by the drive-unit-specific and pivot-angle-specific evaluation function and the horizontal control parameters multiplied by the drive-unit-specific and pivot-angle-specific evaluation function. Advantageously, the evaluation function is a non-linear function based on the pivot angle. By means of the non-linear evaluation and subsequent linear combination, unconsidered couplings between the control loop can also advantageously be considered, in particular when using a plurality of separate controllers for determining the first and second yaw and roll control parameters.

It is advantageously provided that the evaluation function of the vertical control parameters is the cosine of the pivot angle and that the evaluation function of the horizontal control parameters is the sine of the pivot angle. It has been shown that the superimposition using sine and cosine functions can achieve particularly stable flight behavior, in particular during the transition from the vertical flight position into the horizontal flight position, and vice versa.

In a particularly advantageous embodiment of the method, it is provided that a yaw angle and a roll angle are defined in a clockwise manner about a vertical axis and a longitudinal axis, respectively, of the aircraft, in the superimposing step, the actuation parameter $AP_1$ of a first drive unit arranged to the left of the longitudinal axis in a plan view of the aircraft being calculated according to the following model:

$$AP_1 = \cos(\alpha) \cdot r_1 + \cos(\alpha) \cdot g_1 - \sin(\alpha) \cdot r_2 + \sin(\alpha) \cdot g_2, \quad (1)$$

in the superimposing step, the actuation parameter $AP_2$ of a first drive unit arranged to the right of the longitudinal axis in a plan view of the aircraft being calculated according to the following model:

$$AP_2 = -\cos(\alpha) \cdot r_1 - \cos(\alpha) \cdot g_1 + \sin(\alpha) \cdot r_2 - \sin(\alpha) \cdot g_2, \quad (2)$$

in the superimposing step, the actuation parameter $AP_3$ of a second drive unit arranged to the left of the longitudinal axis in a plan view of the aircraft being calculated according to the following model:

$$AP_3 = \cos(\alpha) \cdot r_1 - \cos(\alpha) \cdot g_1 + \sin(\alpha) \cdot r_2 + \sin(\alpha) \cdot g_2, \quad (3)$$

in the superimposing step, the actuation parameter $AP_4$ of a second drive unit arranged to the right of the longitudinal axis in a plan view of the aircraft being calculated according to the following model:

$$AP_4 = -\cos(\alpha) \cdot r_1 + \cos(\alpha) \cdot g_1 - \sin(\alpha) \cdot r_2 - \sin(\alpha) \cdot g_2. \quad (4)$$

If the drive units comprise rotors, a rotational direction of the rotors is advantageously taken into account when determining the actuation parameters.

In order to determine power actuation values, by means of which the individual drive units are subsequently actuated, starting from the thus determined actuation parameters, which advantageously represent power difference values, it is provided that power actuation values $u_1$, $u_2$, $u_3$, $u_4$ of the drive units, by means of which the drive units are actuated, are calculated as follows, taking into account a power requirement variable F and a pitch parameter n, in order to generate the desired power of the individual drive units:

$$u_1 = F - n + AP_1, \quad (5)$$

$$u_2 = F - n + AP_2, \quad (6)$$

$$u_3 = F + n + AP_3, \quad (7)$$

$$u_4 = F + n + AP_4. \quad (8)$$

The power requirement variable may for example be the total power requested by a pilot. The pitch parameter advantageously describes a power difference value which is required to reach a predetermined target pitch angle.

It is advantageously provided that, in the horizontal flight position, the first drive units are arranged in the direction of the vertical axis so as to be spaced apart from the second drive units, and that, in the vertical flight position, the first drive units are arranged in the direction of the longitudinal axis so as to be spaced apart from the second drive units. It is advantageously provided that, in the horizontal flight position, the first drive units are arranged above an upper wing surface and the second drive units are arranged below a lower wing surface, and that, in the vertical flight position, the first drive units and the second drive units are arranged in front of and behind the wing in the horizontal flight direction.

Other advantageous configurations of the method are explained in greater detail with reference to an embodiment shown in the drawings.

BRIEF DESCRIPTION OF THE DRAWINGS

The FIGURE schematically shows a vertical take-off aircraft.

DETAILED DESCRIPTION

The FIGURE schematically shows a vertical take-off aircraft 1. The aircraft 1 comprises two drive groups 3 arranged on opposite wings 2 of the aircraft 1, each drive group 3 comprising a first drive unit 4, 5 and a second drive unit 6, 7. The first drive unit 4, 5 and the second drive unit 6, 7 are each arranged on the wing 2 so as to pivot about a pivot angle α into a horizontal flight position and a vertical flight position. In the FIGURE, the drive units 4, 5, 6, 7 are in the horizontal flight position. The first drive units 4, 5 are arranged on the wings 2 above an upper wing surface 8 and the second drive units 6, 7 are arranged on said wings below a lower wing surface 9. When the drive units 4, 5, 6, 7 are pivoted into the vertical flight position, the first drive units 4, 5 and the second drive units 6, 7 are arranged in front of and behind the wings 2 in the horizontal flight direction. A yaw angle $\gamma_z$, a roll angle $\gamma_x$ and a pitch angle $\gamma_y$ are defined in a clockwise manner about a vertical axis, a longitudinal axis and a transverse axis, respectively, of the aircraft 1.

The drive units 4, 5, 6, 7 each comprise rotors. The rotors of the first drive unit 4 and the second drive unit 7 rotate anti-clockwise and the rotors of the first drive unit 5 and the second drive unit 6 rotate clockwise.

In order to control the yaw angle $\gamma_z$ and the roll angle $\gamma_x$, in a determining step of a control method, first and second yaw and roll control parameters $g_1$, $g_2$, $r_1$, $r_2$ are first determined starting from a predetermined target yaw angle $w_y$, and a predetermined target roll angle $w_{\gamma_x}$ by means of linear controllers $PD_1$, $PD_2$, $PD_3$, and $PD_4$. Actuation parameters $u_1$, $u_2$, $u_3$, $u_4$ are then determined for each drive unit 4, 5, 6, 7 in a superimposing step from the roll control parameters $g_1$, $g_2$, $r_1$, $r_2$. In the FIGURE, the determination of the actuation parameter $u_1$ for the first drive unit 4 is shown by way of example. The determination takes place on the basis of the above-described formulas 1 to 8.

As used in this application, the term "or" is intended to mean an inclusive "or" rather than an exclusive "or". That is, "A or B" refers to any of "A alone," "B alone," and "both A and B" unless specified otherwise or clear from context. The articles "a" and "an" as used in this application should generally be construed to mean "one or more" unless specified otherwise or clear from context to be directed to a singular form.

The invention claimed is:

1. A control method for controlling a yaw angle ($\gamma_z$) and a roll angle ($\gamma_x$) of a vertical take-off aircraft (1) comprising at least two drive groups (3) arranged in opposite side regions of the aircraft (1) so as to be spaced apart from a fuselage of the aircraft,
   wherein each drive group (3) comprises a first drive unit (4, 5),
   wherein each first drive unit (4, 5) is arranged so as to be spaced apart from the fuselage to pivot about a pivot angle (α) into a horizontal flight position and a vertical flight position,
   wherein power generated by each first drive unit (4, 5) is adapted in order to reach a predetermined target yaw angle ($w_{yz}$) and a predetermined target roll angle ($w_{\gamma x}$),
   wherein, in a determination step, a first yaw control parameter ($g_1$) and a second yaw control parameter ($g_2$) as well as a first roll control parameter ($r_1$) and a second roll control parameter ($r_2$) are determined,
   wherein the first yaw control parameter ($g_1$) and the first roll control parameter ($r_1$) are vertical control parameters for reaching the target yaw angle ($w_{yz}$) and the target roll angle ($w_{\gamma x}$) in the vertical flight position,
   wherein the second yaw control parameter ($g_2$) and the second roll control parameter ($r_2$) are horizontal control parameters for reaching the target yaw angle ($w_{yz}$) and the target roll angle ($w_{\gamma x}$) in the horizontal flight position,
   wherein, in a subsequent superimposing step, an actuation parameter is determined, by a superimposing rule for each first drive unit (4, 5), from the vertical control parameters and the horizontal control parameters on the basis of the pivot angle (α),
   wherein a power of each first drive unit (4, 5) is then predetermined taking into account the actuation parameters, and
   wherein, in the superimposing step, the vertical control parameters and the horizontal control parameters are each multiplied by a drive-unit-specific and pivot-angle-specific evaluation function and the actuation parameters for each first drive unit (4, 5) are determined by a linear combination of the vertical control parameters multiplied by the drive-unit-specific and pivot-angle-specific evaluation function and the horizontal control parameters multiplied by the drive-unit-specific and pivot-angle-specific evaluation function.

2. The control method according to claim 1,
wherein each drive group (3) comprises the first drive unit (4, 5) and a second drive unit (6, 7),
wherein the first drive unit (4, 5) and the second drive unit (6, 7) each are arranged so as to be spaced apart from the fuselage to pivot about the pivot angle ($\alpha$) into a horizontal flight position and a vertical flight position.

3. The control method according to claim 1,
wherein the second yaw control parameter ($g_2$) is determined on the basis of the first yaw control parameter ($g_1$) by multiplication by a yaw factor or
wherein the second roll control parameter ($r_2$) is determined on the basis of the first roll control parameter ($r_1$) by multiplication by a roll factor.

4. The control method according to claim 1,
wherein, in the determining step, an actual yaw angle ($y_{\gamma z}$) and an actual roll angle ($y_{\gamma x}$) are determined, and
wherein the control parameters are each determined by a control algorithm starting from the target yaw angle ($w_{\gamma z}$) and the target roll angle ($w_{\gamma x}$) as well as the actual yaw angle ($y_{\gamma z}$) and the actual roll angle ($y_{\gamma x}$).

5. The control method according to claim 4,
wherein the first yaw control parameter ($g_1$) is determined on the basis of the target yaw angle ($w_{\gamma z}$) and the actual yaw angle ($y_{\gamma z}$) using a first yaw control algorithm ($PD_2$) or
wherein the second yaw control parameter ($g_2$) is determined on the basis of the target yaw angle ($w_{\gamma z}$) and the actual yaw angle ($y_{\gamma z}$) using a second yaw control algorithm ($PD_4$) or
wherein the first roll control parameter ($r_1$) is determined on the basis of the target roll angle ($w_{\gamma x}$) and the actual roll angle ($y_{\gamma x}$) using a first roll control algorithm ($PD_1$) or
wherein the second roll control parameter ($r_2$) is determined on the basis of the target roll angle ($w_{\gamma x}$) and the actual roll angle ($y_{\gamma x}$) using a second roll control algorithm ($PD_3$).

6. The control method according to claim 5,
wherein the first yaw control algorithm ($PD_2$) or the second yaw control algorithm ($PD_4$) or the first roll control algorithm ($PD_1$) or the second roll control algorithm ($PD_3$) is a linear controller having a P or PD proportion.

7. The control method according to claim 1,
wherein the evaluation function of the vertical control parameters is the cosine of the pivot angle ($\alpha$) and
wherein the evaluation function of the horizontal control parameters is the sine of the pivot angle ($\alpha$).

8. The control method according to claim 7,
wherein the yaw angle ($\gamma_z$) and the roll angle ($\gamma_x$) are defined in a clockwise manner about a vertical axis and a longitudinal axis, respectively, of the aircraft (1),
wherein, in the superimposing step, a first actuation parameter ($AP_1$) of a first drive unit (4) arranged to the left of the longitudinal axis in a plan view of the aircraft is calculated according to the following model:

$$AP_1 = \cos(\alpha) \cdot r_1 + \cos(\alpha) \cdot g_1 - \sin(\alpha) \cdot r_2 + \sin(\alpha) \cdot g_2,$$

wherein, in the superimposing step, a second actuation parameter ($AP_2$) of a first drive unit (5) arranged to the right of the longitudinal axis in a plan view of the aircraft is calculated according to the following model:

$$AP_2 = -\cos(\alpha) \cdot r_1 - \cos(\alpha) \cdot g_1 + \sin(\alpha) \cdot r_2 - \sin(\alpha) \cdot g_2,$$

wherein, in the superimposing step, a third actuation parameter ($AP_3$) of a second drive unit (6) arranged to the left of the longitudinal axis in a plan view of the aircraft is calculated according to the following model:

$$AP_3 = \cos(\alpha) \cdot r_1 - \cos(\alpha) \cdot g_1 + \sin(\alpha) \cdot r_2 + \sin(\alpha) \cdot g_2,$$

wherein, in the superimposing step, a fourth actuation parameter ($AP_4$) of a second drive unit (7) arranged to the right of the longitudinal axis in a plan view of the aircraft is calculated according to the following model:

$$AP_4 = -\cos(\alpha) \cdot r_1 + \cos(\alpha) \cdot g_1 - \sin(\alpha) \cdot r_2 - \sin(\alpha) \cdot g_2.$$

9. The control method according to claim 8,
wherein power actuation values ($u_1$, $u_2$, $u_3$, $u_4$) of the drive units (4, 5, 6, 7), by means of which the drive units (4, 5, 6, 7) are actuated, are calculated as follows, taking into account a power requirement variable (F) and a pitch parameter (n), in order to generate a desired power of the individual drive units (4, 5, 6, 7):

$$u_1 = F - n + AP_1,$$

$$u_2 = F - n + AP_2,$$

$$u_3 = F + n + AP_3,$$

$$u_4 = F + n + AP_4.$$

* * * * *